(12) United States Patent
Toyota et al.

(10) Patent No.: US 9,874,278 B2
(45) Date of Patent: Jan. 23, 2018

(54) AUTOMATIC TRANSMISSION CONTROL DEVICE

(71) Applicant: Nissan Motor Co., Ltd., Kanagawa (JP)

(72) Inventors: Ryohey Toyota, Kanagawa (JP);
Atsushi Tsukizaki, Kanagawa (JP);
Toshifumi Hibi, Kanagawa (JP);
Yutaka Kaneko, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 62 days.

(21) Appl. No.: 14/768,835

(22) PCT Filed: Dec. 27, 2013

(86) PCT No.: PCT/JP2013/085100
§ 371 (c)(1),
(2) Date: Aug. 19, 2015

(87) PCT Pub. No.: WO2014/141568
PCT Pub. Date: Sep. 18, 2014

(65) Prior Publication Data
US 2016/0003353 A1   Jan. 7, 2016

(30) Foreign Application Priority Data

Mar. 13, 2013  (JP) .................................. 2013-050715

(51) Int. Cl.
*F16H 61/16* (2006.01)
*F16H 61/02* (2006.01)

(52) U.S. Cl.
CPC ......... *F16H 61/16* (2013.01); *F16H 61/0204* (2013.01); *F16H 2306/24* (2013.01)

(58) Field of Classification Search
CPC ...... F16H 61/10; F16H 61/16; F16H 61/0204; F16H 2306/24; B60W 10/11
USPC ......................................................... 701/62
See application file for complete search history.

(56) References Cited

U.S. PATENT DOCUMENTS

| 6,675,084 B2* | 1/2004 | Kim ....................... F16H 61/16 |
| | | 701/55 |
| 8,308,611 B2* | 11/2012 | Rangaraju ............. F16H 61/061 |
| | | 477/135 |
| 2005/0126321 A1 | 6/2005 | Ochi et al. |

(Continued)

FOREIGN PATENT DOCUMENTS

| EP | 0800022 A2 * | 10/1997 | ........... F16H 61/061 |
| EP | 1188961 A2 * | 3/2002 | ........... F16H 61/061 |

(Continued)

*Primary Examiner* — Roger L Pang
(74) *Attorney, Agent, or Firm* — Osha Liang LLP

(57) ABSTRACT

A control device for an automatic transmission disposed in a vehicle driving system, the automatic transmission having an engaging clutch as shift element, has a shift controller that performs a shift control of the automatic transmission. The shift controller is configured such that, during a shift control to release the engaging clutch in response to a first shift request and after determination of a releasing start of the engaging clutch, when a second shift request to engage the engaging cutch is generated, the shift control in response to the first shift request will be continued.

6 Claims, 10 Drawing Sheets

(56) References Cited

U.S. PATENT DOCUMENTS

| | | | | |
|---|---|---|---|---|
| 2005/0137057 A1* | 6/2005 | Shim | ............... | F16H 61/061 477/156 |
| 2014/0142796 A1* | 5/2014 | Zollner | ............ | B60W 10/02 701/22 |
| 2015/0375750 A1* | 12/2015 | Toyota | ............ | B60W 10/02 701/48 |

FOREIGN PATENT DOCUMENTS

| | | | | |
|---|---|---|---|---|
| EP | 2123530 A2 * | 11/2009 | ............ | B60W 10/02 |
| JP | H08-184370 A | 7/1996 | | |
| JP | 2001-141043 A | 5/2001 | | |
| JP | 2007-113608 A | 5/2007 | | |
| JP | 2010-202124 A | 9/2010 | | |

* cited by examiner

AUTOMATIC TRANSMISSION CONTROL DEVICE

CROSS-REFERENCE TO RELATED APPLICATIONS

The present application is a national stage application of PCT/JP2013/085100 filed Dec. 27, 2013, which claims priority to Japanese Patent Application No. 2013-50715, filed with the Japan Patent Office on Mar. 13, 2013, the disclosure of which are incorporated herein by reference in their entirety.

BACKGROUND

Technical Field

The present invention relates to an automatic transmission control device equipped with an automatic transmission having an engaging clutch and a shift controller to perform a shift control of the automatic transmission.

Related Art

Conventionally, a stepped automatic transmission provided with as the shift element, a dog clutch engaged at low speed stage and a friction clutch engaged at high speed stage is known in which a control device performs a shift control by switching clutches between the dog clutch and the friction clutch (for example, see Patent Document 1).

Patent Document: JP 2010-202124 A

SUMMARY

Incidentally, in the conventional control device for the automatic transmission, during a shift control for releasing the dog clutch, that is, during the shift control from low gear speed to high gear speed, a situation may arise in which a new shift request is generated to connect or engage the dog clutch in response to increase in the required driving force from the driver and the like.

In this case, if it is attempted to connect the dog clutch again, excessive torque would act on the dog clutch. Thus, there is concern of decrease in the durability of the dog clutch.

One or more embodiments of the present invention provides a control device for an automatic transmission in which, even at a new shift request to conclude the engaging clutch during the shift control for releasing the engaging clutch, decrease in the durability of the engaging clutch may be prevented.

According to one or more embodiments of the present invention, an automatic transmission has an engaging clutch as shift element is provided in the drive system of the vehicle. According to one or more embodiments of the present invention, a control device comprises a shift controller for performing a shift control of the automatic transmission is provided.

In addition, during a shift control to release the engaging clutch in response to a first shift request and after determination of releasing start of the engaging clutch, when receiving a second shift request to engage the engaging clutch, the shift controller will continue the shift control in response to the first shift request.

According to one or more embodiments of the present invention, during a shift control to release the engaging clutch in response to a first shift request and after determination of releasing start of the engaging clutch, when receiving a second shift request to engage the engaging clutch, the shift controller will continue the shift control in response to the first shift request.

In other words, after determining that the engaging clutch is started to be released, then the second shift request will be disregarded, and the first shift request to release the engaging clutch will be continued. Thus, such a situation would not occur in which the engaging clutch which has been determined to start to be released will be reengaged or reconnected so that the excessive torque is prevented from acting on the engaging clutch.

Consequently, even when there is a new shift request to conclude the engaging clutch during the shift control for releasing the engaging clutch, it is possible to prevent deterioration in durability of the engaging clutch.

DETAILED DESCRIPTION

Below, a description is given of embodiments of the present invention with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

First, description is made of the configuration.

The configuration of a shift control device mounted in an electric vehicle (an example of an electrically driven vehicle) in the first embodiment is described in "the overall system configuration", "detailed configuration of a shift control system" and "transmission control processing configuration", separately.

[Overall System Configuration]

Figure 1:
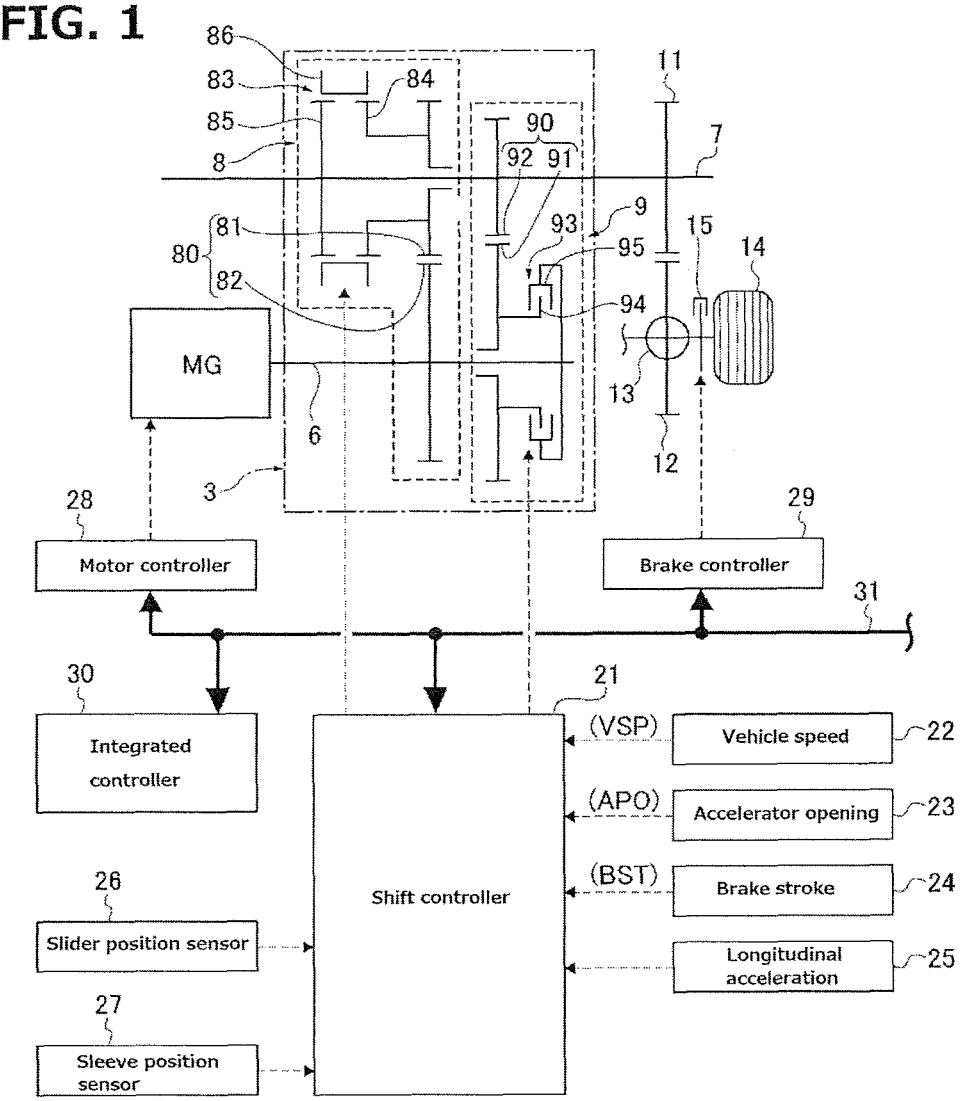
FIG. 1 is an overall system block diagram showing a driving system configuration and a control system configuration of an electric vehicle (an example of an electrically driven vehicle) to which the shift control device of a first embodiment is applied.

FIG. 1 shows a driving system configuration and a control system configuration of an electric vehicle to which the shift control device in the first embodiment is applied. Below, with reference to FIG. 1, the overall system configuration is described.

As the driving system configuration of the electric vehicle, as shown in FIG. 1, a motor generator MG, an automatic transmission 3, a drive wheel 14 are provided.

The motor generator MG is used as a motor serving as a driving source during the power running time, and is used as a generator for regeneration. A motor shaft (output shaft) is connected to a transmission input shaft 6 of an automatic transmission 3.

The automatic transmission 3 is a constant mesh-type stepped transmission which transmits power in one of two gear pairs of different transmission or speed ratios, in which two stage shifting are performed in which a high gear stage (high speed stage) with a low speed reduction ratio and a low gear stage with high speed reduction ratio. The automatic transmission 3 is configured by a low side transmission mechanism 8 for realizing a low speed stage and a high side transmission mechanism 9 for realizing a high speed stage. Note that the transmission input shaft 6 and the transmission output shaft 7 are disposed parallel to each other.

The low-speed side transmission mechanism 8 is used for selecting a low-side transmission path and is disposed on the transmission output shaft 7. The low-side transmission mechanism 8 is made up of by an engaging clutch 83 (meshing clutch) which performs a meshing engagement/release of a gear 81 with respect to the transmission output shaft 7 in order for the low speed stage gear pair 80 (gear 81, gear 82) to drivingly connect between the transmission input shaft 6 and the output shaft 7. Here, the low speed stage gear pair 80 is composed of the gear 81 rotatably supported on the transmission output shaft 7 and the gear 82 which is meshed with the gear 81 and rotates jointly with the transmission input shaft 6.

The high-side transmission mechanism 9 is intended for selecting a high-side transmission path and is arranged on the transmission input shaft 6. This high-speed side transmission mechanism 9 is made up of a friction clutch 93 which performs a frictional engagement/release of a gear 91 with respect to the transmission input shaft 6 in order for the high speed stage gear pair 90 (gear 91, gear 92) to drivingly connect between the transmission input shaft 6 and the output shaft 7. Here, the high speed stage gear pair is composed of the gear 91 rotatably supported on the transmission input shaft 6 and the gear 92 which is meshed with the gear 91 and rotates jointly with the transmission output shaft 7.

The transmission output shaft 7, with a gear 11 fixed thereto, and through a final drive gear set composed of the gear 11 and a gear 12 mashed therewith, is configured to drivingly connect the differential gear unit 13 to the transmission output shaft 7. Thus, the motor power of the motor generator MG which has reached the transmission output shaft 7 is configured to be transmitted to the left and right driving wheels 14 (only one of the drive wheels is shown in FIG. 1) via the final drive gear set (gear s11, 12) and the differential gear unit 13.

As the control system configuration of the electric vehicle, as shown in FIG. 1, a shift controller 21, a vehicle speed sensor 22, an accelerator opening sensor 23, a brake stroke sensor 24, a longitudinal acceleration sensor 25, a slider position sensor 26, a sleeve position sensor 27, and the like are provided. In addition, a motor controller 28, a brake controller 29, an integrated controller 30, and a CAN communication line 31 are provided.

The shift controller 21, when upshifting to the high-speed gear stage in the low gear stage with the engaging clutch 83 in engaged state and the friction clutch 93 released, performs a switching control to release the engaging clutch 83 and to frictionally connect the friction clutch 93. Also, when downshifting to low gear stage in a state in which the engaging clutch 83 is released and the friction clutch 93 is frictionally connected, the shift controller 21 performs a switching control to carry out meshing engagement of the engaging clutch 83 and release of the friction clutch 93. In other words, in the upshift, the engaging clutch 83 of a dog or meshing clutch becomes a released element, while, in the downshift, the engaging clutch 83 of the dog clutch becomes the connecting element.

[Detailed Configuration of the Speed Control System]

Figure 2:
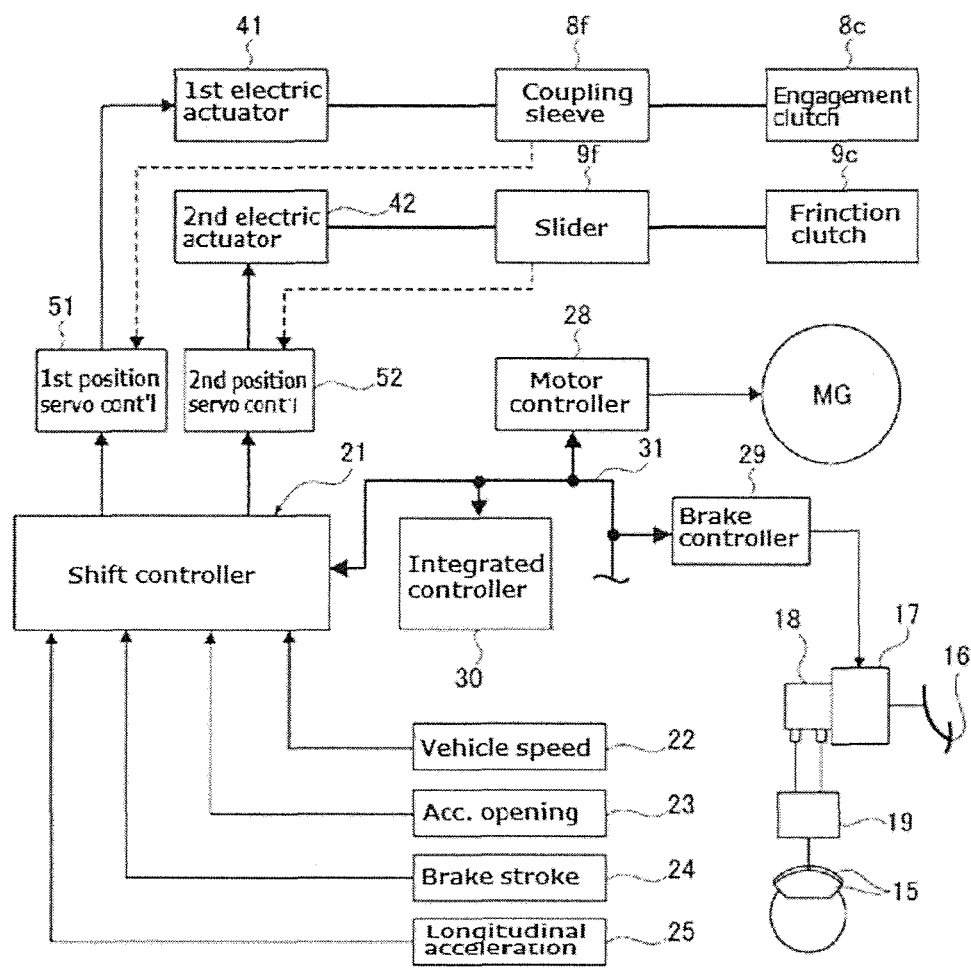
FIG. 2 is a control block diagram showing a detailed configuration of a shift control system of the first embodiment.

FIG. 2 shows a detailed configuration of a shift control system of the first embodiment. Below, with reference to FIG. 2, a detailed configuration of the shift control system is described.

As a configuration of the shift control system of the control system of the electric vehicle, as shown in FIG. 2, an engaging clutch 83, a friction clutch 93, a motor generator MG, a hydraulic brake 15, a shift controller 21, and an integrated controller 30 are provided. Specifically, the engaging clutch 83 and the friction clutch 93 are configured to perform a shift control based on a request from the shift controller 21. The motor generator MG and the hydraulic brake 15 are configured to cooperate to perform a regenerative brake control in accordance with a request from the integrated controller 30.

The engaging clutch 83 is a clutch of meshing engagement, synchronous type, and includes a clutch gear 84 provided on the gear 81 and a clutch hub 85 attached to the transmission output shaft 7, and a coupling sleeve 86 (See FIG. 1). Further, by driving in stroke the coupling sleeve 86 by a first electric actuator 41, meshing engagement/release is performed. According to one or more embodiments of the present invention, the coupling sleeve 86 including the first electric actuator 41 corresponds to the "actuator for the engaging clutch." The meshing engagement and the release of the engaging clutch 83 are determined by the position of the coupling sleeve 86. The shift controller 21 reads the value of the sleeve position sensor 27 and is provided with a first position servo controller 51 (for example, position servo system with PID control) which provides a current to the first electric actuator 41, so that the sleeve position is located in the meshing engagement position or the release position.

Further, when the coupling sleeve 86 is in meshed engagement position shown in FIG. 1, where the coupling sleeve 85 is meshed with the outer periphery clutch teeth of both clutch gear 84 and that of the clutch hub 85, the gear 81 is drivingly connected to the transmission output shaft 7. On the other hand, when the coupling sleeve 86 is in a non-meshing position (releasing position) with the outer periphery clutch teeth of one of the clutch gear 84 and the clutch hub 86, the gear 81 is released from the transmission output shaft 7.

Furthermore, based on FIG. 3A to FIG. 3D, a description is added of the synchronization mechanism of the engaging clutch 83. The coupling sleeve 86, while maintaining a state of meshing with a spline portion (not shown) formed on the outer periphery of the clutch hub 85 (see FIG. 1), is supported movably axially in the left-right direction in FIG. 3A. The axial movement of the coupling sleeve 86 is made by driving the first electric actuator 41 (see FIG. 2).

The clutch gear 84 is formed with a spline portion 84a at the outer periphery, which can be meshed with the spline portion 86a in the inner periphery of the coupling sleeve 86. Furthermore, a synchronizer ring 87 is mounted axially movable on a tapered cone portion 84b of the clutch gear 84.

The synchronizer ring 87 is formed with a spline portion 87a on the outer periphery, which can be engaged with the spline portion 86a of the coupling sleeve 86, and engagement possible spline portion 87a of the coupling sleeve 86 is formed. Further, the synchronizer ring 87 is configured to be movable in the rotational direction relative to the key 88 provided on the coupling sleeve 86 by the amount of clearance of the key groove 87c (see FIG. 3B, etc.).

Now, a description of the engaging clutch 83 will be given of the synchronizing operation of the synchronization mechanism with respect to the engaging clutch when changing from a released state to the engaged connection. In the engaging clutch 83, when changing to the engaged connection from the released state, the coupling sleeve 86 presses the synchronizer ring 87 in the axial direction so as to approach the clutch gear 84. As a result, due the resulting friction force between the synchronizer ring 87 and the cone portion 84b, the coupling sleeve 86 and the clutch gear 84 are connected to rotate in synchronization.

Figure 3A:
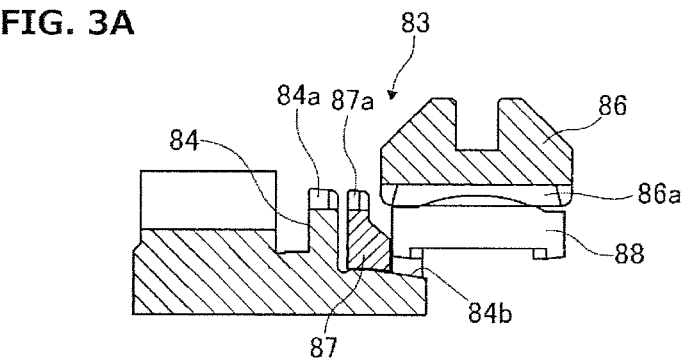
FIG. 3A is an explanatory view showing an essential part cross section of the engaging clutch of the first embodiment.

In other words, by moving the coupling sleeve 86 by the first electric actuator 41 (see FIG. 2) axially, as shown in FIG. 3A, together with the key 88, in a direction to be close to the clutch gear 84, the synchronizer ring 87 is brought contact with the cone portion 84b.

Figure 3B:
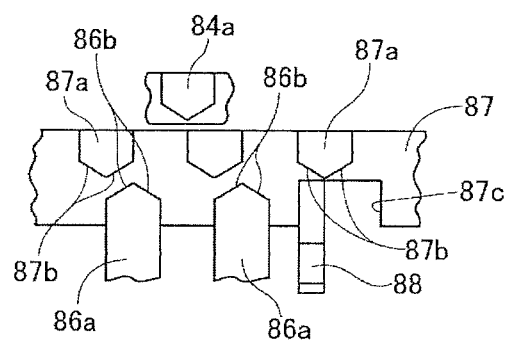
FIG. 3B is an explanatory view of the first embodiment showing the operation of the engaging clutch in the rotation synchronization initial state of the engaging initial stage.

When the synchronizer ring 87 is in contact with the cone portion 84b, because rotation is occurring between the two relative, the synchronizer ring 87 rotates only by the clearance or gap of the key groove 87c shown in FIG. 3B. Thus, a chamfer portion 87b of the spline portion 87a of the synchronizer ring 87 and a chamfer portion 86b of the spline portion 86a of the coupling sleeve 86, as shown in FIG. 3B, are brought into an index state in an axially aligned or faced to each other.

Figure 3C:
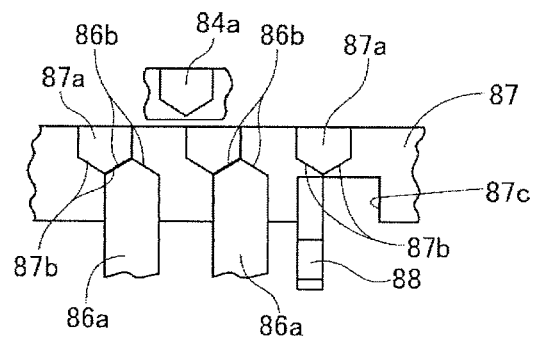
FIG. 3C is an explanatory view of the first embodiment showing the operation of the engaging clutch in the middle of the rotation synchronization.

By moving the coupling sleeve 86 further to the clutch gear 84 side from the index state, as shown in FIG. 3C, both chamfer portions 87b, 86b are in contact. Thus, the synchronizer ring 87 is further press the cone portion 84b to generate the friction torque so that the synchronizer ring 87, the coupling sleeve 86, and the clutch gear 84 are synchronized.

Figure 3D:
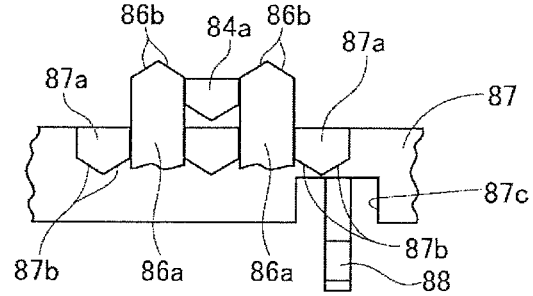
FIG. 3D is an explanatory view of the first embodiment showing the operation of the engaging clutch at the end of the rotation synchronization.

When this rotation synchronization is established, the friction torque between the synchronizer ring 87 and the cone portion 84b disappears, and the coupling sleeve 86 is further moved in the axial direction. Thus, the spline portion 86a of the coupling sleeve 86 puts its way through, the synchronizer ring 87, and as shown in FIG. 3D, is meshed with the spline portion 84a of the clutch gear 84, so that the engaging clutch 83 is in the engaged connection state.

As described above, disposed between the gear 81 and the clutch hub 85, with the axial movement of the coupling sleeve 86, due to the friction occurring with relative movement between the input side and the output side of the engaging clutch 83, a synchronous rotation of the input side and the output side is performed by the force. In other words, the clutch gear 84, the coupling sleeve 86, and synchronizer ring 87 constitute a synchronization mechanism.

Note that, in the engaging clutch 83, when releasing from the engaged connection state, the coupling sleeve 86 is axially moved by the first electric actuator 41 (see FIG. 2) together with the key 88 in a direction separating from the clutch gear 84. In this case, the spline portion 86a of the coupling sleeve 86 will be withdrawn from the spline portion 87a of the synchronizer ring 87.

Then, when the spline portion 86a is pulled out from the spline portion 87a of the synchronizer ring 87, the clutch gear 84, the synchronizer ring 87, and the coupling sleeve 86 are resolved from the synchronized state. At the same time, the synchronizer ring 87 is rotated, and the chamfer portion 87b and the chamfer portion 86b of the coupling sleeve 86 are brought into a state of contact.

Then, when the coupling sleeve 86 is further moved in a direction away from the clutch gear 84, both chamfer portion 87b, 86b are released from the contract state. As a result, the spline portion 86a of the coupling sleeve 86 is completely separated from the synchronizer ring 87 so that the engaging clutch 83 is in the released state.

The friction clutch 93 includes a driven plate 94 which rotates together with the gear 91, and a drive plate 95 which rotates together with the transmission input shaft 6, (see FIG. 1). Further, by driving a slider 96 to impart a pressing force to both plates 94, 95 by the second electric actuator 42, the frictional engagement/release is performed.

The transmission torque capacity of the frictional clutch 93 is determined by a position of the slider 96. Also, the slider 96 is a screw mechanism, so that, when the input of the second electric actuator 42 is 0 (zero), the position is configured to be held. The shift controller 21 reads the value of the slider position sensor 26 and is provided with a second position servo controller 52 (for example, position servo system by PID control) so that a slider position for obtaining a desired transmission torque capacity may be achieved.

Further, the friction clutch 93 rotates jointly with the transmission input shaft 6, and drivingly connects the gear 91 to the transmission input shaft 6 when frictionally engaging and, when releasing, separates the drive connection between the gear 91 and the transmission input shaft 6, The motor generator MG is controlled in a driving or regenerative mode by the motor controller 28 which receives a request output from the integrated controller 30. In other words, when the motor controller 28 receives a motor torque request, the motor generator MG is brought into a drive mode. On the other hand, when the motor controller 28 receives a regenerative torque request, the motor generator MG is put in regenerative control.

The hydraulic brake 15 gives a hydraulic braking force to the drive wheels 14 by the brake fluid being supplied via a brake pedal 16→the electric booster 17→master cylinder 18→brake fluid the pressure actuator 19. The hydraulic brake 15, during regenerative cooperative brake control, in response to the brake controller 29 inputting a brake fluid pressure command, controls the brake fluid pressure by outputting a drive command corresponding to a share of the hydraulic braking force to the electric booster 17. Here, the regenerative cooperative brake control is intended to describe the control in which the required braking force is calculated on the basis of the brake stroke amount BST from a brake stroke sensor 24 (or the required deceleration), and the calculated braking force is achieved by sharing the regenerative braking force and the hydraulic braking force. Basically, in order to increase the electricity consumption performance, the regenerative braking force is determined based on the maximum regenerative torque available at that time, and the remainder obtained by subtracting the regenerative braking force from the required braking force is borne by the hydraulic braking force.

Figure 5:
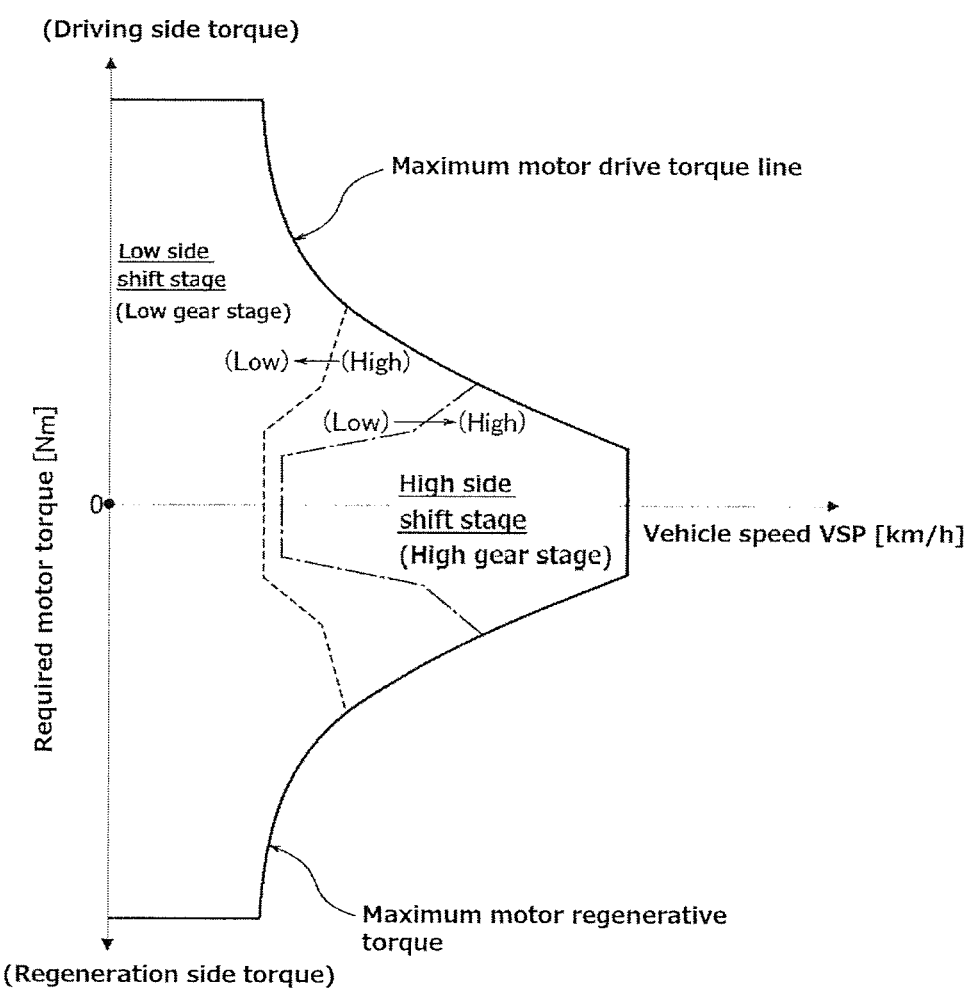
FIG. 5 is a shift map diagram showing an example of the upshift line and a downshift line of the automatic transmission used in the shift controller in the first embodiment.

The shift controller 21 receives the information from the vehicle speed sensor 22, accelerator opening sensor 23, a brake stroke sensor 24, and a longitudinal acceleration sensor 25, etc., and controls the upshift and downshift of the automatic transmission 3 by using a shift map showing a shift line (as shown in FIG. 5, for example).

[Shift Control Procdessing Configuration]

Figure 4:
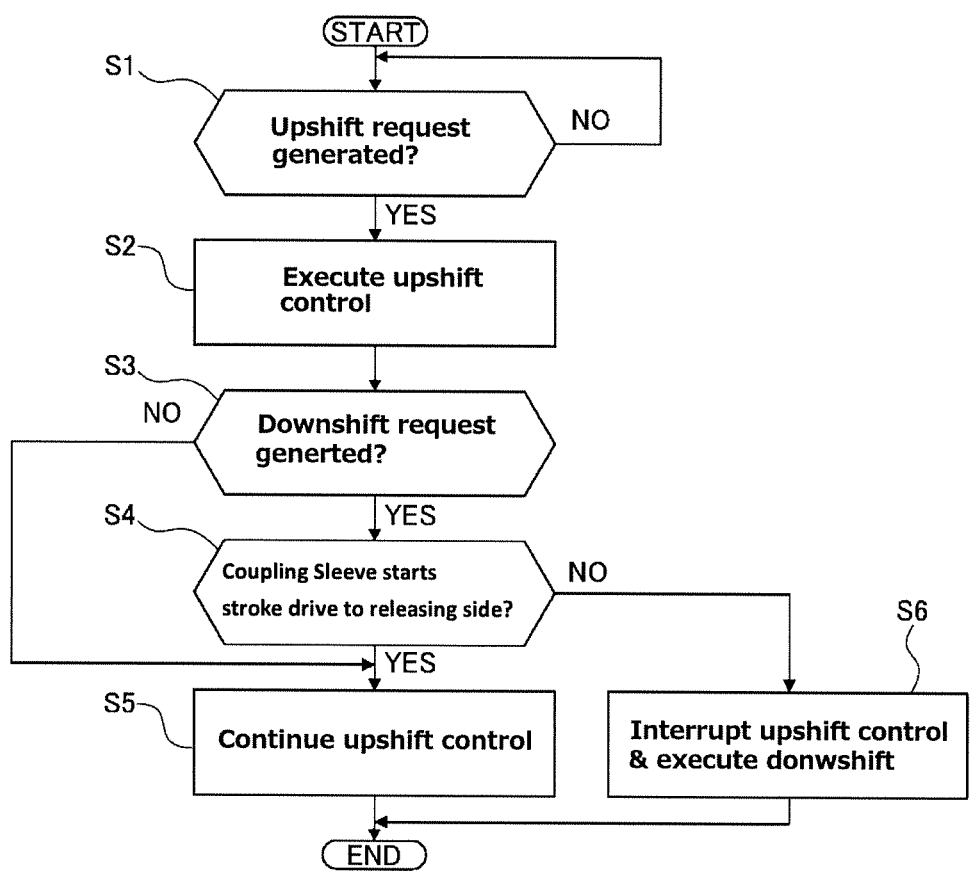
FIG. 4 is a flowchart showing a flow of shift control process executed by a shift controller in the first embodiment.

FIG. 4 shows a flow of a shift control process executed by the shift controller in the first embodiment. Below, based on FIG. 4, a description is given of each step representing a shift control processing configuration.

At step S1, it is determined whether or not an upshift request (first shift request) is generated in a state in which a low gear stage is being selected with the engaging clutch 83 being in engaged connection. If YES (upshift request present), control proceeds to step S2, while, if NO (no upshift- Here, the upshift request is generated when the operating point determined by the vehicle speed VSP and the required motor torque crosses an upshift line due to increase in vehicle speed VSP and the like in the shift map (FIG. 5) used in the shift controller 21. Note that the vehicle speed VSP is detected by the vehicle speed sensor 22. Also, the required motor torque is calculated on the basis of the accelerator opening APO detected by the accelerator opening sensor 23 or the brake stroke amount BST detected by the brake stroke sensor 24.

In step S2, following the determination that the upshift request is generated in step S1, execution of the upshift control is started, and control proceeds to step S3.

This upshift control starts a switching control to allow the engaging clutch 83 to be released from the engaged state while connecting the friction clutch 93 from the released state.

In step S3, following the determination of the start of the upshift control in step S2, it is determined whether or not a downshift request (second shift request) to the low shift stage has been generated to connect the engaging clutch 83.

If YES (downshift request present), control proceeds to step S4, while, if NO (no downshift request), control proceeds to step S5.

Here, the downshift request is generated when the operating point determined by the vehicle speed VSP and the required motor torque crosses a downshift line due to depression on the accelerator pedal by the driver and the like in the shift map (FIG. 5) used in the shift controller 21.

In step S4, following the determination that the downshift request is present in step S3, at the time of the downshift request generation, it is determined whether or not the coupling sleeve 86 of the engaging clutch 83 starts a stroke drive toward the releasing side. When YES (stroke drive present), control proceeds to step S5, whereas, when NO (stroke drive not present), control proceeds to step S6.

Here, the "stroke drive of the coupling sleeve" is intended to indicate a situation in which the coupling sleeve 86 is pressed toward the releasing position by the first electric actuator 41 to change the sleeve position. In other words, when the position of the coupling sleeve 86 is moved toward the releasing position from the engaged position of the engaging clutch 83, it is determined that the stroke drive has been started.

In step S5, following the determination in step S3 that no downshift request is present, or the determination in step S4 that there is a sleeve stroke, it is assumed that the releasing operation of the engaging clutch 83 has been started, the downshift request which has been determined to be output in step S3 is disregarded and the upshift control which had been started in step S2 will be continued. After completion of the upshift control, control ends.

Note that, at the time of completion of the upshift control, when a downshift request is determined to be generated based on the position of the operating point in the shift map and the like, process immediately executes the downshift control.

In step S6, following the determination that there is no sleeve stroke at step S4, it is determined that the releasing operation of the engaging clutch 83 has not yet been started, control interrupts the upshift control which had been started at step S2 and executes a downshift control in response to the new shift request, i.e., the downshift request. After completion of the downshift control, control ends.

Now, a description is given of the operation.

The operation in the control device of the automatic transmission of the first embodiment is described in "a normal shift control operation", "an upshift continuing operation at the time of downshift request generation during upshift operation", and "a downshift executing operation at the time of downshift request generation during upshift operation", separately.

[Normal Shift Control Operation]

The shift controller 21 receives a vehicle speed from the vehicle speed sensor 22, an accelerator opening APO from the accelerator opening sensor 23, and a brake stroke amount BST from the brake stroke sensor 24, a. Further, based on the information and the shift map exemplified in FIG. 5, as described below, a shift control of the automatic transmission 3 will be performed.

In the shift map in FIG. 5, a thick solid line shows the maximum motor driving torque line obtained by connecting the maximum motor driving torque value of motor generator MG for each vehicle speed, and the maximum motor regeneration torque line by connecting the maximum motor regeneration torque of the motor generator MG for each vehicle speed. The region surrounded by these lines defines the practice or operation enabling region.

Within this operation enabling region, in consideration of the speed change loss of the automatic transmission 3 and the motor loss of the motor generator MG, an upshift line shown by a dashed line (Low→High) and a downshift line shown by a broken line (High→Low) are set respectively.

Note that the upshift line (Low→High) is set on the side of higher vehicle speed than the downshift line (High→Low) by the hysteresis amount.

Further, during the drive running state in which the accelerator pedal is being depressed, the shift controller 21 determines the operating point based on a required motor driving torque obtained from the accelerator opening APO and the vehicle speed VSP.

On the other hand, during braking operation in which the brake pedal 16 is being depressed, the operating point is determined based on the requested motor regenerative torque required by the brake stroke amount BST and the vehicle speed VSP.

When the operating point is determined, on the shift map in FIG. 5, a target shift stage (low gear stage or high gear stage) appropriate for the current driving state is obtained depending on in which of the low side shift stage region and the high side shift stage region the operating point exists.

Next, when the target shift stage or gear position thus determined is in the low gear stage, the engaging clutch 83 is put is an engaged connection state to select the low gear stage with the friction clutch 3 being released. Further, when the target shift stage thus determined is in the high gear stage, a high gear stage selected stage is achieved in which the friction clutch 93 is put in the frictional connection state while the engaging clutch 83 is in the released state.

Further, during the low gear stage selected state, when the operating point within the operation enabling region crosses the upshift line (Low→High) to enter the high side shift stage region, the target shift stage is switched to the high gear stage. On the other hand, during the high gear selected state, when the operating point in the operation enabling region crosses the downshift line (High→Low) to enter the low side shift stage region, the target shift stage will be switched over to the low gear stage. Then, in response to switching of the target shift stage, either an upshift request or a downshift request is output to execute the shift control in accordance with the shift request (i.e. upshift control or downshift control).

In the normal shift control, the upshift control for shifting the automatic transmission 3 from the low gear stage to the high gear stage is carried out by a switching shift in which the engaging clutch 83 in the engaged connection state is released while the friction clutch 93 in the released state is frictionally connected. On the other hand, the downshift control for shifting the automatic transmission 3 from the high gear stage to the low gear stage is carried out by a switching shift in which the engaging clutch 83 in the released state is engaged for connection while the friction clutch 93 in the frictionally engaged state is released.

[Upshift Continuing Operation at the Time of Downshift Request Generation During Upshift Operation]

Figure 6:
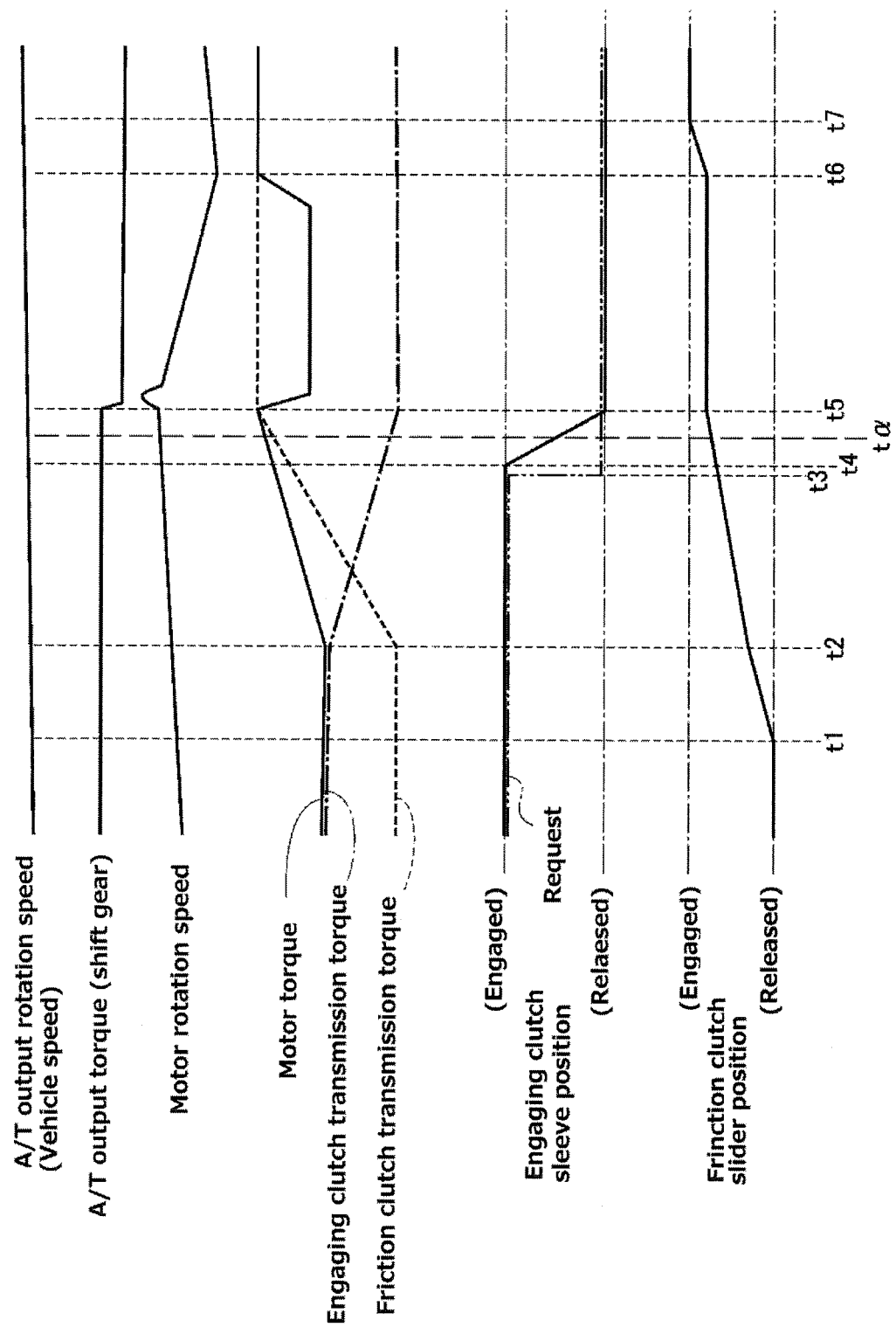
FIG. 6 is a time chart in the control device of the first embodiment showing each characteristic including an output rotation speed of the automatic transmission, an output torque of the automatic transmission, a motor rotation speed, a motor torque, a transmission torque of an engaging clutch, a transmission torque of a friction clutch, a sleeve position of the engaging clutch, a slider position of the friction clutch, respectively, in which, despite a second to first (2→1) shift request being generated during a first to second shift control, the 1→2 shift control is continued.

FIG. 6 is a time chart in the control device of the first embodiment showing each characteristic including an output rotation speed of the automatic transmission, an output torque of the automatic transmission, a motor rotation speed, a motor torque, a transmission torque of an engaging clutch, a transmission torque of a friction clutch, a sleeve position of the engaging clutch, a slider position of the friction clutch, respectively, in which, despite a second to first (2→1) shift request being generated during a first to second shift control, the 1→2 shift control is continue. Below, with reference to FIG. 6, a description is given of the upshift continuing operation at the time of the downshift request generation during upshift operation.

At time t1 in the time chart shown in FIG. 6, during running in the low gear stage selected state, when the operating point crosses the upshift line (Low→High) to enter the High side shift stage region, an upshift request (first request) is output. Thus, control proceeds from step S1 to step S2 in the flowchart of FIG. 4, and the upshift control is executed so that the slider 96 of the friction clutch 93 representing the engaging side element is driven by the second actuator 42 to stuff or reduce the backlash of the slider 96. In other words, the slider 96 moves gradually from the releasing position to the engaged position.

At time t2, when the slider 96 completes the backlash reduction, while the transmission torque of the friction clutch 93 starts to increase, at the same time, the motor generator MG is controlled in torque so that the motor torque representing an input torque to the automatic transmission will increase. Here, the transmission torque of the engaging clutch 83 representing a releasing side element will gradually decrease since this is the difference between the input torque (motor torque) into the automatic transmission 3 and the transmission torque of the friction clutch 93.

Then, at time t3 in the course of increasing the transmission torque of the friction clutch 93, a releasing request to release the engaging clutch 83 is output. Note that this releasing request is output from the shift controller 21 via the first position servo controller 51 to the first electric actuator 41. Also, the releasing request is obtained with the timing in mind, at which the input torque (motor torque) to the automatic transmission 3 matches the transmission torque of the friction clutch 93, and by calculating hack from the time (time t5) at which the coupling sleeve 60 reaches the releasing position.

At time t4, the coupling sleeve 86 of the engaging clutch 83 starts moving from the engaged position toward the releasing position. Thus, since the stroke drive of the coupling sleeve 86 has been carried out, it is determined that the releasing operation of the engaging clutch has started.

Subsequently, at time to, when the operating point crosses the downshift line (High→Low) to enter the Low side shift region, a downshift request (second shift request) is generated. However, at the time to, it is determined that the stroke drive of the coupling sleeve has already been done and the engaging clutch has started releasing operation (time t4). Therefore, in the flowchart of FIG. 4, the process proceeds to step S3→step S4→step S5, and the upshift control is continued.

In other words, the releasing Operation of the engaging clutch 83 is continued, and at the time t5, the coupling sleeve 86 reaches the releasing position so that the engaging clutch 83 is completely released. Thus, the motor torque and transmission torque of the friction clutch match each other so that the transmission torque of the engaging clutch will be zero. Subsequently, the rotation speed control of the motor generator MG is started. Note that, at this time, the slider 96 of the friction clutch 93 stops in a position in which the friction clutch 93 maintains the slip engaged state.

At time t6, when the motor rotation speed matches the target rotation speed, the slider 96 of the friction clutch 94 is driven in the engaging direction, and at time t7, when the friction clutch 93 is completely engaged, the upshift control ends and a high gear stage selected state is achieved.

As described above, in the control device of the first embodiment, during the shift or speed change control for releasing the engaging clutch 83 in response to the upshift request, after determining the start of releasing of the engaging clutch 83, when a downshift request to connect this engaging clutch 83, the upshift control in response to the upshift request is continued. Thus, during the upshift control, the engaging clutch 83 will be prevented from being placed in the engaged state from the state of determination to release initiation so that excessive torque will be prevented from acting on the coupling sleeve 86 and the synchronizer ring 87.

Therefore, it is possible to reduce the wear of the engaging clutch 83 and to prevent the durability from being impaired.

[Downshift Executing Operation at the Time of Downshift Request Generation During Upshift Operation]

Figure 7:
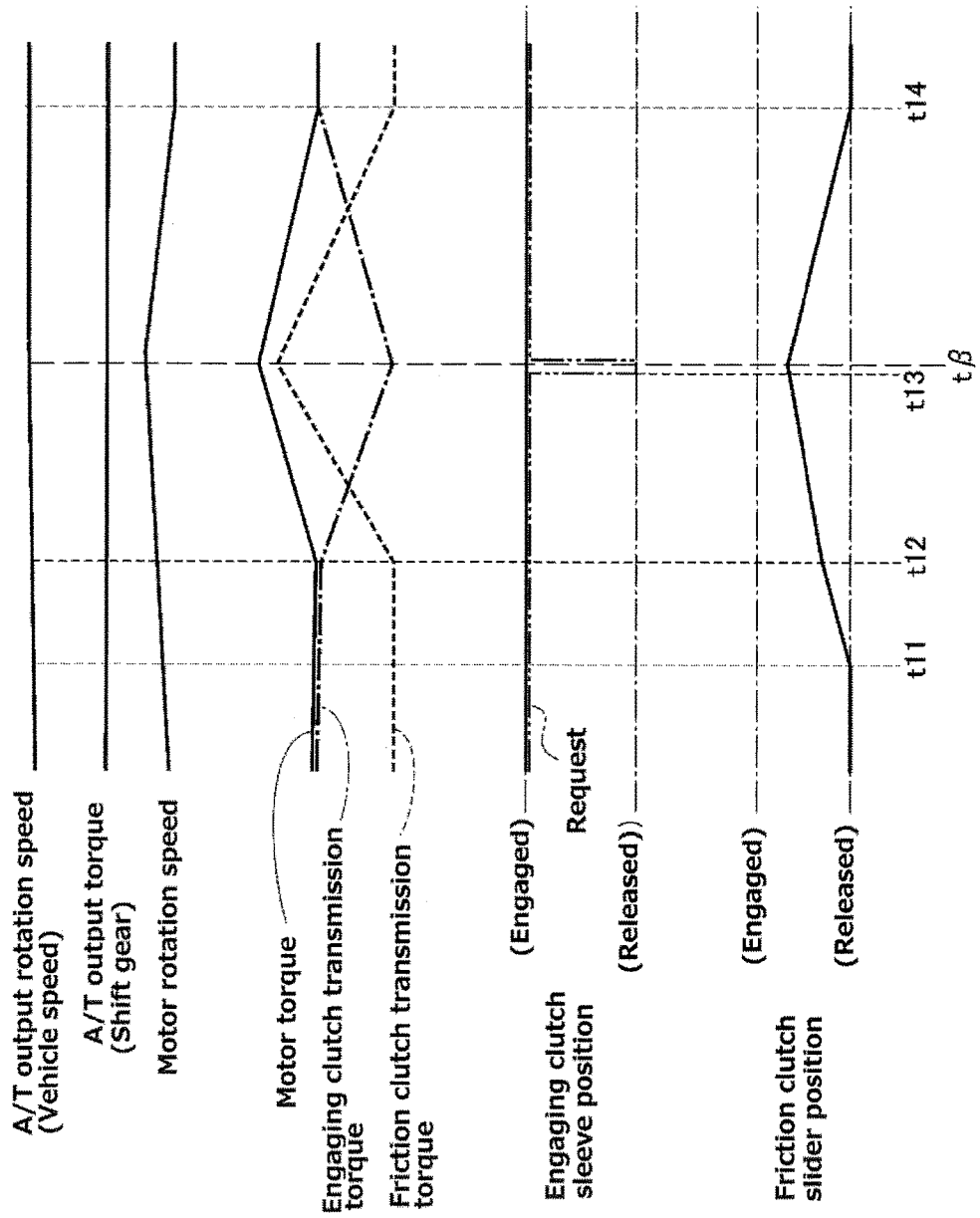
FIG. 7 is a time chart in the control device of the first embodiment showing each characteristic including an output rotation speed of the automatic transmission, an output torque of the automatic transmission, a motor rotation speed, a motor torque, a transmission torque of an engaging clutch, a transmission torque of a friction clutch, a sleeve position of the engaging clutch, a slider position of the friction clutch, respectively, in which, in response to a second to first (2→1) shift request being generated during a first to second shift control, the 2→1 shift control is executed.

FIG. 7 is a time chart in the control device of the first embodiment showing each characteristic including an output rotation speed of the automatic transmission, an output torque of the automatic transmission, a motor rotation speed, a motor torque, a transmission torque of an engaging clutch, a transmission torque of a friction clutch, a sleeve position of the engaging clutch, a slider position of the friction clutch, respectively, in which, in response to a second to first (2→1) shift request being generated during a first to second shift control, the 2→1 shift control is executed Below with reference to FIG. 7, a description is given of the downshift executing operation at the time of downshift request generation during upshift operation.

At time t11 in the time chart shown in FIG. 7, during running in the low gear stage selected state, when the operating point crosses the upshift line(Low→High) to enter the High side shift stage region, an upshift request (first request) is output. Thus, control proceeds from step S1 to step S2 in the flowchart of FIG. 4, and the upshift control is executed so that the slider 96 of the friction clutch 93 representing the engaging side element is driven by the second actuator 42 to stuff or reduce the backlash of the slider 96. In other words, the slider 96 moves gradually from the releasing position to the engaged position.

At time t12, when the slider 96 completes the backlash reduction, while the transmission torque of the friction clutch 93 starts to increase, at the same time, the motor generator MG is controlled in torque so that the motor torque representing an input torque to the automatic transmission will increase. Here, the transmission torque of the engaging clutch 83 representing a releasing side element will gradually decrease since this is the difference between the input torque (motor torque) into the automatic transmission 3 and the transmission torque of the friction clutch 93.

Then, at time t13 in the course of increasing the transmission torque of the friction clutch 93, a releasing request to release the engaging clutch 83 is output. Subsequently, at time tβ, when the operating point crosses the downshift line (High→Low) to enter the Low side shift region, a downshift request (second shift request) is generated.

Here, the time tβ represents a time in which, although the releasing request is output with respect to the engaging clutch 83, the coupling sleeve 86 is in a position before moving from the engaged position. Thus, in the flowchart of FIG. 4, the process proceeds to step S3→step S4→step S6. Thus, the upshift control is interrupted, and the downshift control is executed. In other words, the automatic transmission 3 will return to the low gear stage selected state. Therefore, when an engaging request is output to connect or engage the engaging clutch 83 immediately after outputting a downshift request, the coupling sleeve 86 of the engaging clutch 83 remains in the engaged position, without moving, such that the complete engaged state will be maintained.

On the other hand, the slider 96 of the friction clutch 93 starts to move toward the releasing position from the point in time t13 in which the downshift request is generated, and the transmission torque of the friction clutch 9 starts to decrease. Also, the motor generator MG is controlled in torque, so that the motor torque representing the input torque to the automatic transmission 3 is reduced. Note that the transmission torque of the engaging clutch 83 is represented by the difference between the input torque to the automatic transmission 3 (motor torque) and the transmission torque of the friction clutch 93 and thus will increase gradually.

Then, at time t14, when the slider 96 of the friction clutch 93 reaches the releasing position, the transmission torque of the friction clutch is zero, and the transmission torque of the motor torque and the transmission torque of the engaging clutch 83 match each other. Thus, the downshift control ends, and the low gear stage selected state is achieved.

Thus, in the control device of the first embodiment, during the speed change or shift control for releasing the engaging 83 in response to an upshift request, when a downshift request to engage or connect this engaging clutch 83 is generated prior to determining the releasing start of the engaging clutch 83, the upshift control is cancelled to execute the downshift control in response to the downshift request. Therefore, even in the middle of the upshift control, it is possible to immediately respond to the downshift request and meet the newly generated shift request. Also, the releasing operation of the engaging clutch 83 is not performed, and the engaged connection state will be maintained. Therefore, it is possible to prevent excessive torque being acting against the engaging clutch 83 and reduce the wear of the engaging clutch 83 to thereby prevent the durability from being impaired.

Moreover, in the control device of the first embodiment, once the coupling sleeve 86 has begun to move toward the engaged position to the releasing position, that is, once a stroke drive of the coupling sleeve 86 has been started, the releasing start of the engaging clutch 83 is determined.

Thus, by determining the releasing start after the coupling sleeve 86 has actually started to move, it is possible to respond to the downshift request up to the time limit at which wear of the engaging clutch 83 is likely to occur. The occurrence of engaging the clutch 83 can meet the downshift request. That is, while securing the durability of the engaging clutch 83, it is possible to respond maximally to the downshift request.

In the control device for an automatic transmission of the first embodiment, one or more of the following effects may be obtained.

(1) In a control device for an automatic transmission 3 disposed in a vehicle drive system, the automatic transmission having an engaging clutch 83 as shift element and a shift controller 21 for performing a shift control of the automatic transmission 3, the shift controller 21 is configured such that, during a shift control to release the engaging clutch 83 in response to a first shift request (upshift request) and after determination of releasing start of the engaging clutch 83, when a second shift request (downshift request) to engage the engaging clutch 83 is generated, the shift control (upshift control) in response to the first shift request (upshift request) will be continued. Thus, even when there is a new shift request (downshift request) generated during the shift control (upshift control) for releasing the engaging clutch 83, it is possible to prevent deterioration in durability of the engaging clutch 83.

(2) The engaging clutch 83 is controlled by allowing an actuator (coupling sleeve 86) of the engaging clutch to stroke for engagement/release, wherein the shift controller 21 is configured to determine the releasing start of the engaging clutch 83 when the actuator (coupling sleeve 86) of the engaging clutch strokes towards the releasing side. Thus, in addition to the effect of (1), it is possible to respond to the second shift request (downshift request) up until the limit at which wear of the engaging clutch occurs.

Second Embodiment

In a second embodiment, the determination of releasing start of the engaging clutch is different from that in the first embodiment.

Figure 8:
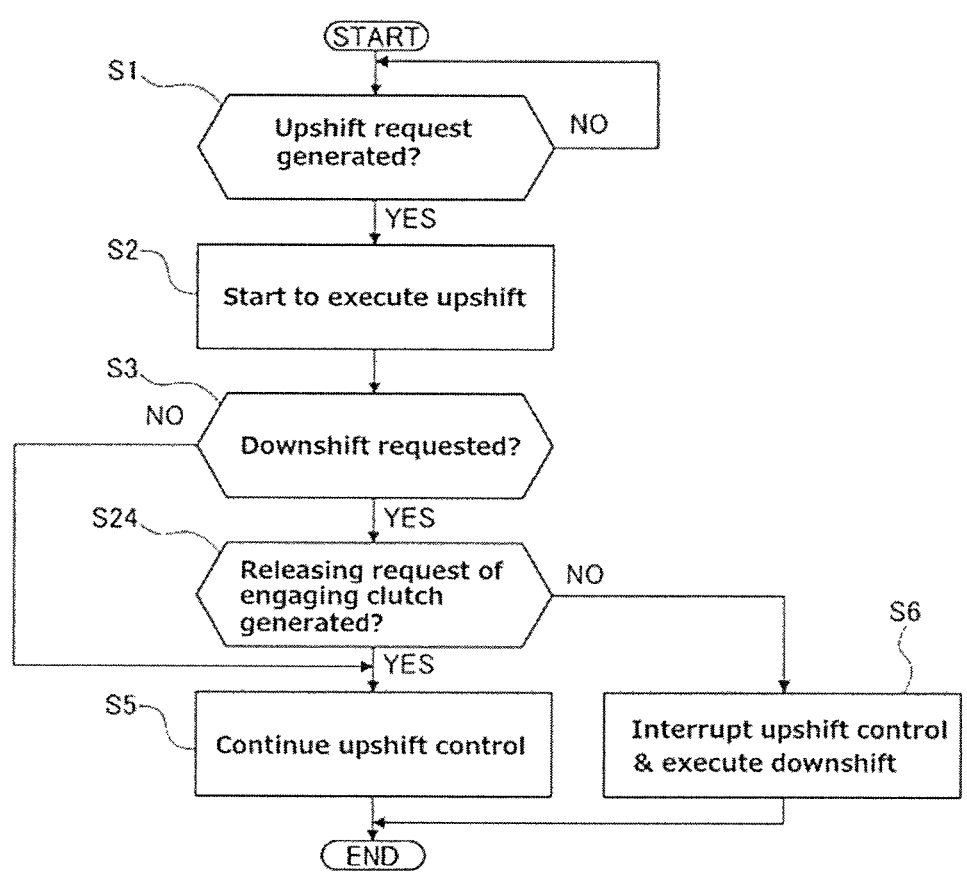
FIG. 8 is a flowchart showing a flow of shift control process executed by a shift controller in a second embodiment.

FIG. 8 is a flowchart showing a flow of shift control process executed by a shift controller in the second embodiment. Below, with reference to FIG. 8, a description is given of the control device of the automatic transmission of the second embodiment. Note that the steps similar to the first embodiment are attached with the same reference numerals and the detailed description thereof will be omitted.

In step S3 of FIG. 8, when it is determined that there is down-shift request, the process proceeds to step S24. In step S24, following the determination that there is down-shift request in step S3, it is determined whether or not a releasing request to release the engaging clutch 83 has been output. When YES (releasing request present), control proceeds to step S5, whereas when NO (no releasing request), control proceeds to step S8. Here, "the releasing request" is a request which is output to the first electric actuator 41 from the shift controller 21 via the first position servo controller S1. The first electric actuator 41 allows the coupling sleeve 86 to make a stroke drive by the releasing request.

Thus, in response to the releasing request output to the engaging clutch 83, when the releasing request has been output, regardless of the actual operating state of the engaging clutch 83, a determination is made of the releasing start of the engaging clutch 83. Thus, it is possible to This makes it possible to prevent the influence of time lag in determining continuation permissivity of the shift control after the stroke drive of the engaging clutch 83 has been detected.

In other words, as in the first embodiment, when it is determined whether or not to respond to a downshift request after detecting that the engaging clutch 83 is actually performing releasing operation, the releasing control of the engaging clutch 83 might progress during the determination process. Thus, there is a possibility that an appropriate decision cannot be made. In contrast, at the stage where the releasing request is output, when determination is made of the releasing start of the engaging clutch 83, it is possible to determine whether or not to respond to the downshift request before the releasing operation of the engaging clutch 83. Therefore, it may be possible to carry out an appropriate decision. Moreover, it is possible to determine whether or not to respond to the downshift request before the releasing operation regardless of the detection accuracy of the sleeve position sensor 27 for detecting the position of the coupling sleeve 86.

In the control device of the automatic transmission in the second embodiment, it may be possible to obtain one or more of the effects listed below.

(3) The shift controller 21 is configured to determine the releasing start of the engaging clutch 83 when a releasing request has been output to the engaging clutch 83. Thus, in addition to the effect of (1), it is possible to avoid the influence of the time lag which would occur when determining the continuation permissivity of the shift control after the stroke drive of the engaging clutch 83 is detected.

Third Embodiment

In a third embodiment, when continuing the upshift control despite a downshift request, the transmission torque of the friction clutch is configured to be different from the transmission torque of the first embodiment.

Figure 9:
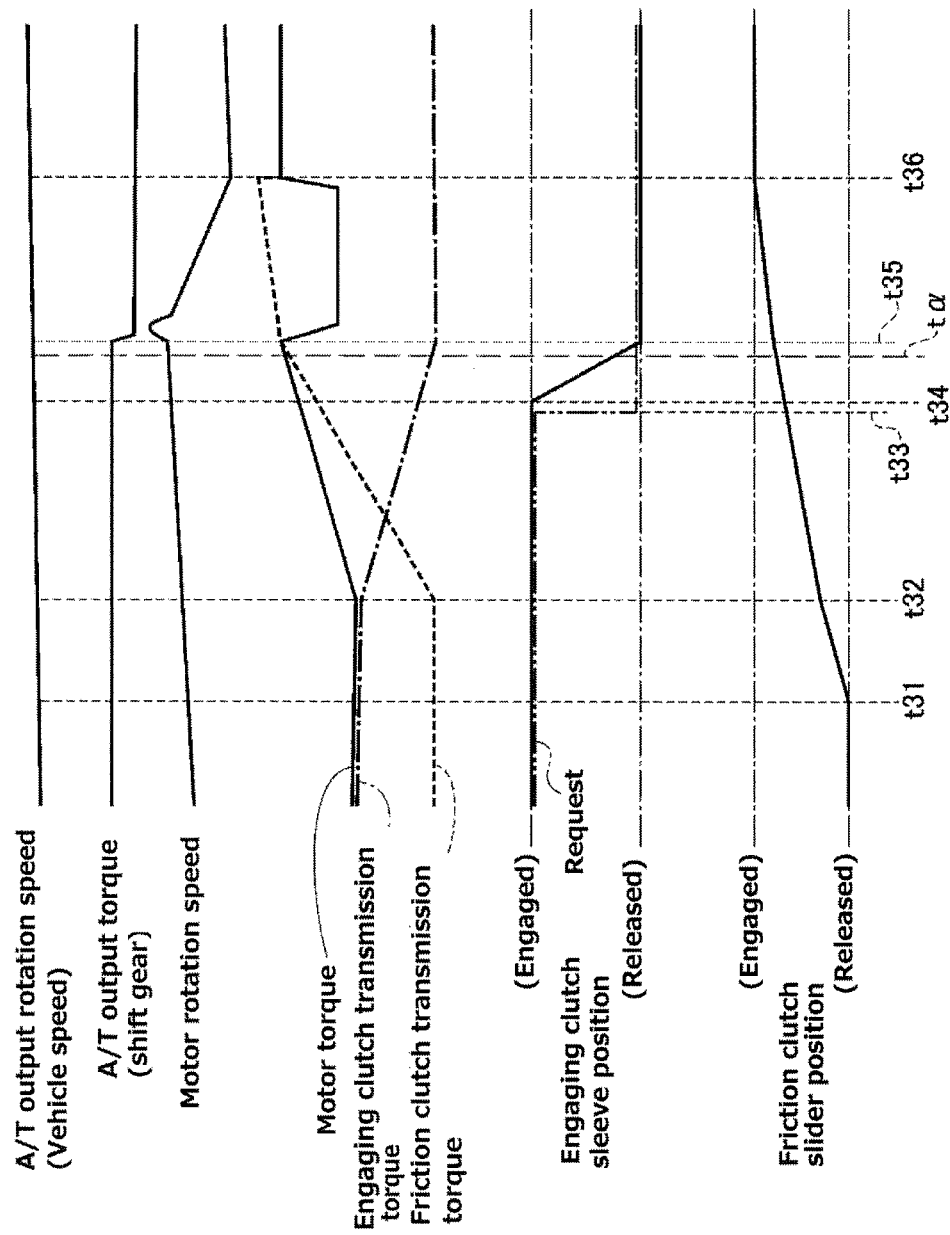
FIG. 9 is a time chart in the control device of a third embodiment showing each characteristic including an output rotation speed of the automatic transmission, an output torque of the automatic transmission, a motor rotation speed, a motor torque, a transmission torque of an engaging clutch, a transmission torque of a friction clutch, a sleeve position of the engaging clutch, a slider position of the friction clutch, respectively, in which, despite a second to first (2→1) shift request being generated during a first to second shift control, the 1→2 shift control is continued.

FIG. 9 is a time chart in the control device of the third embodiment showing each characteristic including an output rotation speed of the automatic transmission, an output torque of the automatic transmission, a motor rotation speed, a motor torque, a transmission torque of an engaging clutch, a transmission torque of a friction clutch, a sleeve position of the engaging clutch, a slider position of the friction clutch, respectively, in which, despite a second to first (2→1) shift request being generated during a first to second shift control, the 1→2 shift control is continued.

In the control device of the third embodiment, as shown in FIG. 9, during the shift control for releasing the engaging clutch 83 in response to an upshift request, after determining the releasing start of the engaging clutch 83, even when a downshift request is generated to engage or connect the engaging clutch 83, the upshift control in response to the upshift request will be continued. Moreover, the transmission torque of the friction clutch after the downshift request is made greater than the transmission torque at the time at which the downshift request has not been made.

That is, at time t31 in the time chart shown in FIG. 9, when an upshift request (first shift request) is output, the execution of the upshift control is started, and firstly the slider 96 of the friction clutch 93 representing an engaging element is driven by the second electric actuator 2 to reduce backlash of the slider 96.

At time t32, when the backlash of the slider 96 is completely reduced, the transmission torque of the friction clutch 93 starts to increase. At the same time, the motor generator is controlled in torque to increase the input torque to the automatic transmission 3. Further, the transmission torque of releasing element, i.e. engaging clutch 83 will decrease gradually.

Then, at time t33 in the course of increasing the transmission torque of the friction clutch 93, a releasing request to release or disconnect the engaging clutch 83 is output. At time t34, the coupling sleeve 86 of the engaging clutch 83 starts to move from the engaged position to the releasing position. Thus, it is determined that the releasing operation of the engaging clutch 83 has been started.

At a subsequent time tα, even when a downshift request (second shift request) is generated, since the releasing start of the engaging clutch 83 has been determined at the time of tα, the upshift control is continued.

Thus, the releasing operation of the engaging clutch 83 continues, and, at time t35, the coupling sleeve 86 reaches the releasing position so that the engaging clutch 83 is fully released. Thus, the motor torque and the transmission torque of the friction torque match each other; the transmission torque of the engaging clutch 83 will be zero. Subsequently, the rotation control of the motor generator MG will be started. At this time, the slider 96 of the friction clutch 93 will stop in a position in which the friction clutch 93 maintains the slip state (see FIG. 6), as in the first embodiment, when no downshift request has been output during the shifting process.

In contrast, in the third embodiment, as shown in FIG. 9, the slider 96 of the friction clutch 93 does not stop in a position in which the friction clutch 93 maintains the slip engaging state, but continues to move to a position of complete engaged state. That is, the transmission torque of the friction clutch continues to increase after time t35, and becomes larger than the case in which the downshift request is not output in the middle of the shifting operation.

Then, at time t36, once the friction clutch 93 is completely engaged, the friction clutch transmission torque and the motor torque coincide each other and the upshift control is finished to assume a state in which the high gear stage is selected.

Thus, by setting the transmission torque of the friction clutch greater than in a case in which the downshift is not output, the time (from time t35 to time t36) from the release of the engaging clutch 83 to engagement of the friction clutch 93 will be shorter compared to the time (from t5 to time t7; see FIG. 6) from the release of the engaging clutch 83 to engaging of the friction clutch 93 where the friction clutch is completely engaged after maintaining the transmission torque of the friction clutch so that the friction clutch 93 is stopped while maintain the slip engaging state. Thus, the time from upshift request being outputted to the upshift control being ended can be reduced than when the downshift request during the shift control has not been generated.

Note that when the downshift request is output during the upshift control, the output of the downshift request will be expected immediately after the up-shifting control, immediately be expected. Therefore, it is necessary for the shift-up control to be completed in a short time to thereby prepare for the subsequent shift request. Therefore, by setting the transmission torque of the friction clutch greater than the case without the downshift request being output, the shift-up control is completed in a short time so that it is advantageous with respect to the operation control of the automatic transmission 3 after completion of the upshift control.

In the control device for an automatic transmission of the third embodiment, it may be possible to obtain one or more of the effects listed below.

(4) The automatic transmission 3 has the engaging clutch 83 and a friction clutch 93 for switching shift from the engaging clutch 83, wherein the shift controller 21 is configured to set the transmission torque of the friction clutch 93 in a case in which the shift control (upshift control) in response to the first shift request (upshift request) is continued despite the second shift request (downshift request) being generated greater than the transmission torque of the friction clutch 93 during the shift control (upshift control) in response to the first shift request (upshift request) without the second shift request (downshift request) being generated.

Thus, in addition to any one of the effects of (1) to (3), the upshift control may be completed in a short time, and the operation control of the automatic transmission 3 after completion of the upshift control may be performed advantageously.

As describe above, a description is given of the control device for the automatic transmission according to first to third embodiments. However, the specific configurations are not limited to these embodiments. Rather, without departing the gist of inventions each pertaining to respective claim, design change or addition may be acceptable.

In one or more embodiments described above, an example is shown in which the automatic transmission has an engaging clutch 83 and a friction clutch 93, in which two shift or speed gear stages are provided with a high gear state and a low gear stage. However, it is sufficient for the automatic transmission to have the engaging clutch only so that such an automatic transmission only with an engaging clutch as shift element or a transmission with shift stages of two or more shifting stages.

Figure 10:
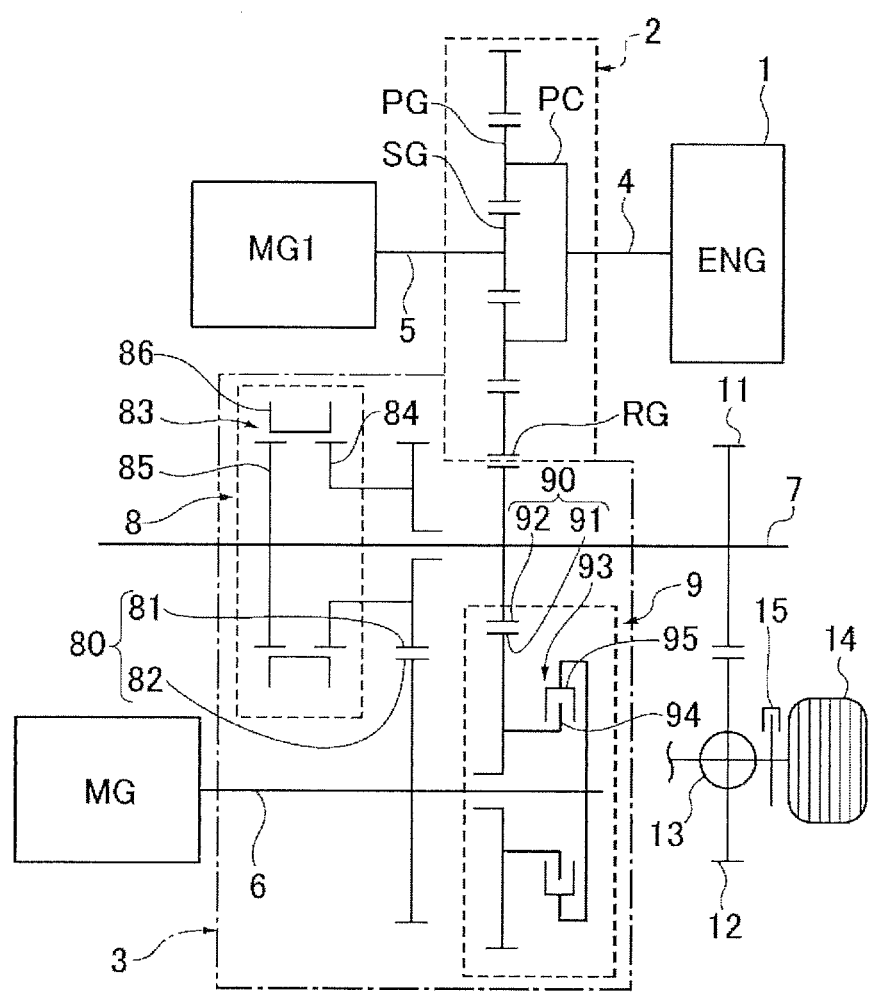
FIG. 10 is an example of the driving system configuration of a hybrid vehicle (another example of the vehicle) to which the control device according to one or more embodiments of the present invention is applicable.

In one or more embodiments described above, an example is shown in which the control device for an automatic transmission according to one or more embodiments of the present invention is applied to an electric vehicle including a motor generator MG as a driving source. However, the shift control device according to one or more embodiments of the present invention may be applied to a hybrid vehicle having an engine and a motor generator as driving source. For example, as a hybrid vehicle having an engine and two motor generators as driving source, as shown in FIG. 10, the driving system of the first embodiment may be added with an engine 1, a power generating motor generator MG1, and a driving force distribution unit 2. Further, the control device according to one or more embodiments of the present invention may be applied to a normal engine driven vehicle or an electric driven vehicle such as a fuel cell vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A control device for an automatic transmission disposed in a vehicle driving system, the automatic transmission having an engaging clutch as shift element and a friction clutch for switching shift from the engaging clutch, comprising:
 a shift controller that performs a shift control of the automatic transmission to release the engaging clutch to connect the friction clutch,
 wherein the shift controller is configured such that, during the shift control to release the engaging clutch in response to a first shift request and after determination of a releasing start of the engaging clutch, when a second shift request to engage the engaging clutch is generated, the shift control in response to the first shift request will be continued,
 wherein the engaging clutch is controlled by allowing an actuator for the engaging clutch to stroke for engagement/release, and
 wherein the shift controller determines the releasing start of the engaging clutch when the actuator for the engaging clutch strokes towards a releasing side.

2. The control device for an automatic transmission as claimed in claim 1,
 wherein the automatic transmission comprises the engaging clutch and a friction clutch for switching shift from the engaging clutch,
 wherein the shift controller sets the transmission torque of the friction clutch in a case in which the shift control in response to the first shift request is continued despite the second shift request being generated greater than the transmission torque of the friction clutch during the shift control in response to the first shift request without the second shift request being generated.

3. A control device for an automatic transmission disposed in a vehicle driving system, the automatic transmission having an engaging clutch as shift element, comprising:
 a shift controller that performs a shift control of the automatic transmission,
 wherein the shift controller is configured such that, during a shift control to release the engaging clutch in response to a first shift request and after determination of a releasing start of the engaging clutch, when a second shift request to engage the engaging clutch is generated, the shift control in response to the first shift request will be continued, wherein the engaging clutch is controlled by allowing an actuator for the engaging clutch to stroke for engagement/release, wherein the shift controller determines the releasing start of the engaging clutch when the actuator for the engaging clutch strokes towards a releasing side, wherein the shift controller is further configured such that, during the shift control to release the engaging clutch in response to the first shift request and before determination of the releasing start of the engaging clutch, when the second shift request to engage the engaging clutch is generated, the shift control in response to the second shift request will be executed.

4. The control device for an automatic transmission as claimed in claim 3, wherein the shift controller determines the releasing start of the engaging clutch when a releasing request has been output to the engaging clutch.

5. The control device for an automatic transmission as claimed in claim 3, wherein the automatic transmission comprises the engaging clutch and a friction clutch for switching shift from the engaging clutch, wherein the shift controller sets the transmission torque of the friction clutch in a case in which the shift control in response to the first shift request is continued despite the second shift request being generated greater than the transmission torque of the friction clutch during the shift control in response to the first shift request without the second shift request being generated.

6. The control device for an automatic transmission as claimed in claim 4, wherein the automatic transmission comprises the engaging clutch and a friction clutch for switching shift from the engaging clutch, wherein the shift controller sets the transmission torque of the friction clutch in a case in which the shift control in response to the first shift request is continued despite the second shift request being generated greater than the transmission torque of the friction clutch during the shift control in response to the first shift request without the second shift request being generated.

\* \* \* \* \*